May 23, 1944.  G. R. HEIMERICH  2,349,427
INDUSTRIAL X-RAY FILM HOLDER
Filed Aug. 10, 1943  2 Sheets-Sheet 1
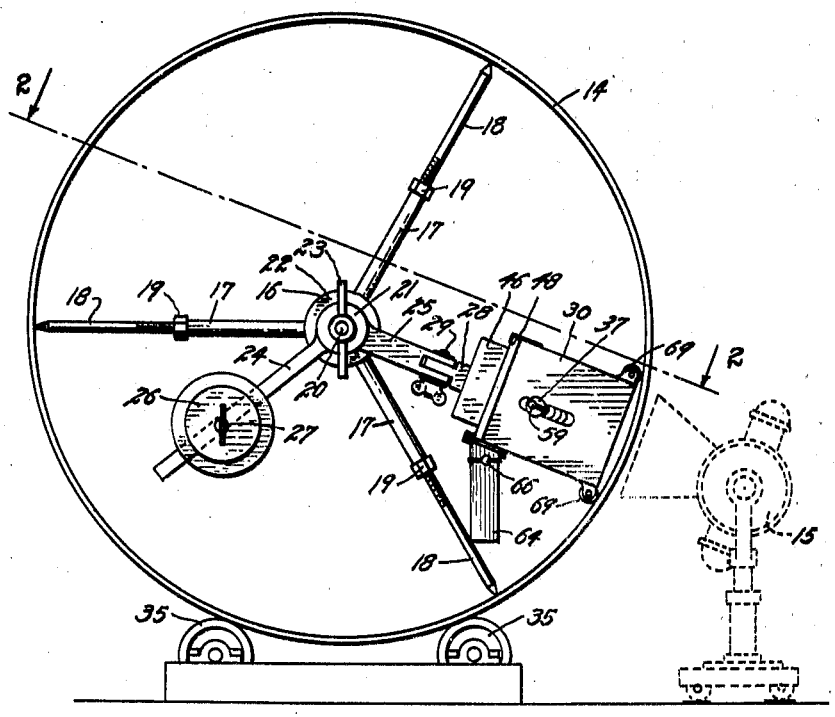
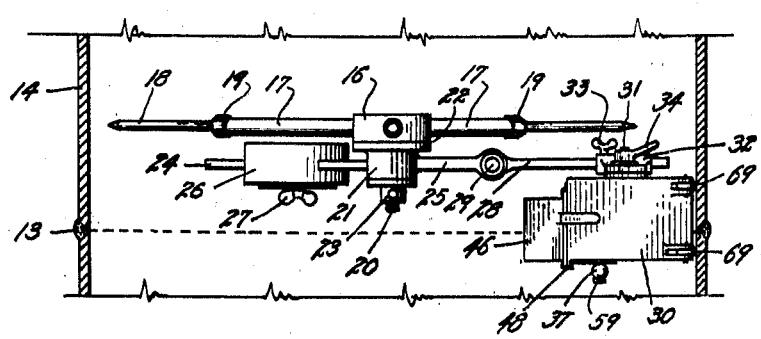
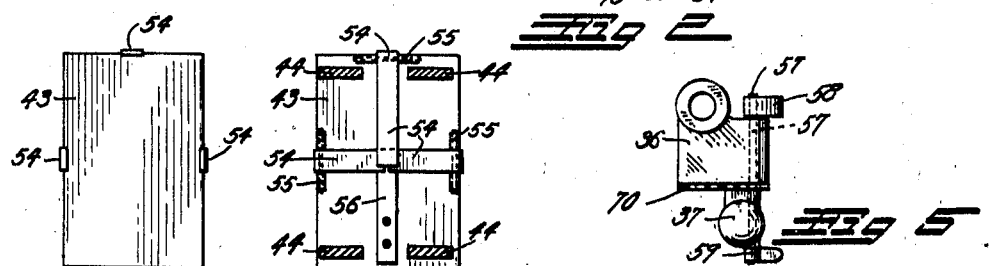
INVENTOR.
GEORGE R. HEIMERICH
BY
ATTORNEY.

May 23, 1944.  G. R. HEIMERICH  2,349,427
INDUSTRIAL X-RAY FILM HOLDER
Filed Aug. 10, 1943  2 Sheets-Sheet 2
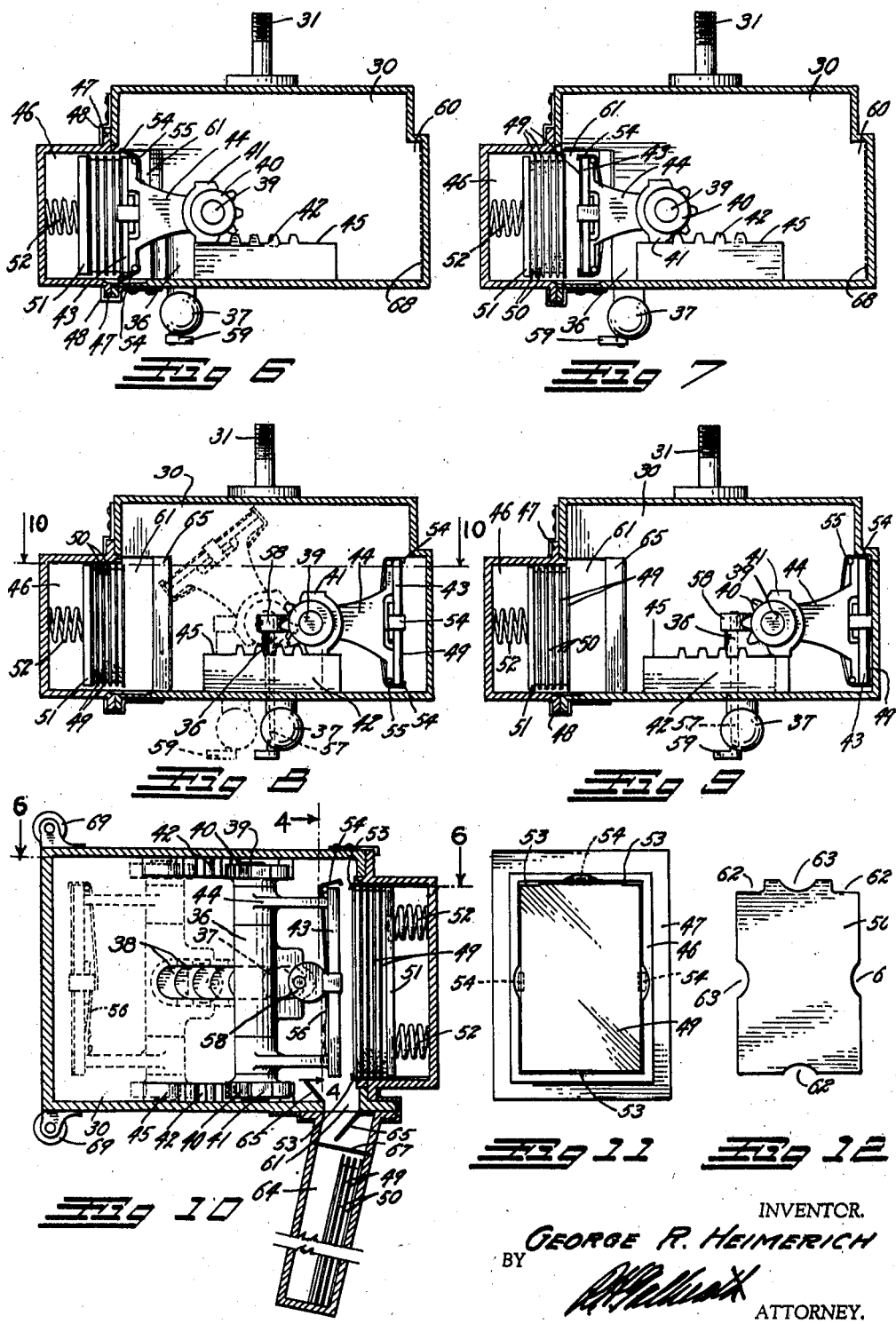
INVENTOR.
GEORGE R. HEIMERICH
BY
ATTORNEY.

Patented May 23, 1944

2,349,427

UNITED STATES PATENT OFFICE 2,349,427

INDUSTRIAL X-RAY FILM HOLDER

George R. Heimerich, Denver, Colo.

Application August 10, 1943, Serial No. 498,130

17 Claims. (Cl. 250—65)

This invention relates to a device for supporting and changing X-ray film for industrial uses. Flaws and weaknesses in metallic structures are detected by means of X-ray photographs of the structures. The supporting and changing of the films on the interiors of large structures and pieces is an exceedingly difficult and time-consuming task. For instance, in photographing the circumferential welded seams of large cylindrical pressure chambers, an overlapping series of pictures are required for developing the entire circumference of the given joint or seam. This involves continuous changing of the position of the X-ray machine, and the continuous dismantling and erecting of supports for supporting the film at the various positions on the inside of the structural chamber.

The principal object of this invention is to provide a supporting structure for a film holder whereby a cylindrical subject can be rotated without disturbing the position of the film holder on the interior thereof, so that the relation between the film holder and the X-ray machine will remain fixed while the subject is rotated between the successive exposure positions, to obtain a continuous succession of overlapping photographs without removal or change in the film supporting mechanism.

Another object of the invention is to provide a highly efficient X-ray film holder and changer which will successively expose the individual films of a magazine of films without requiring removal of the holder to the dark room between exposures.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 illustrates the invention being used to provide a series of X-ray photographs of the circumferential seam or joint in a cylindrical subject;

Fig. 2 is an inclined section, taken on the line 2—2, Fig. 1, illustrating the supporting device for the improved film holder;

Fig. 3 is a detail front view of the film holding plate employed in the improved film holder;

Fig. 4 is a detail sectional view illustrating a rear view of the film holding plate, the section being taken on the line 4—4, Fig. 9;

Fig. 5 is a detail side view of the slidable carriage employed in the improved film holder;

Fig. 6 is a horizontal section through the improved film holder taken on the line 6—6, Fig. 10, illustrating the film supporting plate as it would appear ready to remove an unexposed film from the film magazine;

Fig. 7 is a similar view illustrating the position of the elements as the film is withdrawn from the magazine;

Fig. 8 is a similar view illustrating the action of the invention in carrying the film from the magazine to the exposure position;

Fig. 9 is a similar view illustrating the film in the place ready for the exposure;

Fig. 10 is a vertical longitudinal section through the improved film holder taken on the line 10—10, Fig. 8, with the film holding plate in the releasing position;

Fig. 11 is a face view of the open side of a film magazine as employed in the invention; and Fig. 12 is a detail view illustrating a cardboard separator such as employed in the film magazine of the invention.

For the purpose of illustration the invention is illustrated in Figs. 1 and 2 as it would appear when being used to photograph a circumferential seam 13 of a tank 14 which is rotatably supported on rollers 35. A typical industrial X-ray device is indicated at 15. The X-ray device may be of any desired type, and in itself forms no part of the present invention. The latter is directed solely to the mechanism for the support of the film at a point within the subject opposite the X-ray device 15.

The improved X-ray film holder employs a tripod supporting device consisting of a tripod block 16 from which three tubular legs 17 project in a common plane. A threaded extension bar 18 projects from each of the tripod legs 17, the projection of which is regulated by means of extension nuts 19. When positioned in a cylindrical subject such as the tank 14 the nuts 19 are rotated to bring the extension bars snugly against the inner wall with the tripod block 16 at the axial center line of the tank. The block 16 carries an axially-positioned, projecting, threaded, axle stud 20 upon which a hub member 21 is rotatably mounted. The hub member 21 is provided with a base flange 22 which can be pressed against the tripod block by rotation of a hand nut 23 so as to lock the hub member in any desired position thereon. Loosening of the hand nut 23 allows the axle stud to freely rotate within the hub member 21.

Two arms project radially from the hub member 21 at outward and downward angles, one being a counterweight arm 24, the other being a film holder arm 25. A counterweight 26 is slidably mounted on the weight arm 25 and can be secured in any desired position thereon by means of a thumb set-screw 27. A holder supporting bar 28 is secured to the extremity of the arm 25 by means of a suitable adjustable clamping hinge 29. The bar 28 adjustably supports a film holding box 30. The box 30 is provided with a threaded projecting stud 31 by means of which it is adjusably secured to a rod clamp 32. The rod clamp may be set in any desired position along the rod 28 by means of a suitable set-screw 33, and the box 30 may be set in any desired rotative position relative to the clamp 32 by means of a clamp nut 34.

It can be seen that with a hand nut 23 loosened, and with the counterweight 26 properly adjusted, the holder box 30 will be supported at any given elevation opposite the interior wall of the tank 14 regardless of rotation of the latter. In use, the counterweight is so adjusted in relation to the X-ray machine 15 that the holder box 30 will remain in line with the X-ray device 15, regardless of changes in position of the tank. The box 30 is preferably provided with contact rollers 69 to prevent damage from friction with rough internal surfaces. The clamping hinge 29 allows the box to be set on an angle to accommodate conical surfaces.

A carriage 36 is slidably mounted within the box 30 and provided with a shifting handle 37, projecting through a slot in one side of the box 30, by means of which it may be manipulated from the exterior. The slot for the handle 37 is lightproofed in any desired manner, such as by means of a plurality of sliding diaphragm leaves 38 or in any other ways common in the art. The carriage acts as a journal to support a cross shaft 39 which terminates at its extremities in interrupted gears 40. The gears 40 are of special construction, that is, they carry gear teeth for one-half their circumference and at both ends of the series of gear teeth flat rests 41 are provided. The gears 40 coact with toothed racks 42 fixedly mounted on the box 30. The racks are also of special construction, that is, they carry rack teeth corresponding in number to the tooth spaces of the gears and terminate in flat resting surfaces 45 at each extremity. Therefore each complete shift of the handle 37 rotates the shaft 39 one-half a revolution.

A film holding plate 43 is supported from the shaft upon suitable bracket arms 44. The latter are secured to and rotate with the shaft. Therefore when the handle 37 is moved from the rear of the box to the front, the film holding plate 43 will be swung from the rearwardly facing position of Fig. 7 to the forwardly facing position of Fig. 8 and will be rigidly held in its rearmost and foremost positions by the rests 41 which slide on flattened surfaces 45 on the extremities of the racks 42.

The holder plate 43 is provided with film engaging hooks 54 extending around the top and two side edges thereof. These hooks are mounted on hinges 55 and are elongated at the back so that they extend over the back of the plate 43 to overlapping relation at the center thereof, as shown in Fig. 4. The elongated back portions of the hooks are constantly urged outwardly from the plate 43 by means of a leaf spring 56. The action of the spring in forcing the rearward portions of the hooks outwardly causes the forward hooked portions thereof to grip the front face of the plate 43 so as to support a film thereon. A releasing cam 58 is mounted on the carriage 36 at a point where it will contact the overlapping extremities of the hooks 54 when the holder plate is in its rearmost position, as shown in Fig. 6. The cam 58 is mounted on a cam shaft 57 extending to a releasing lever 59 on the handle 37. By rotation of the cam 58, the rear extremities of the hooks 54 are depressed against the action of the spring 56 to cause their hooked extremities to open as shown in Fig. 5.

A film magazine 46 is detachably mounted on the rear end of the box 30 in any desired manner, such as by means of face flanges 47 which slide in receiving slides 48 on the box 30. The magazine carries a supply of unexposed films 49 stacked in alternating relation with film separators 50 of cardboard or other suitable material. The entire stack of film and separators is constantly urged forwardly by a pusher pad 51 actuated by compression springs 52. The foremost film is held in the holder by small shoulders 53 which overlap the upper and lower edges thereof as shown in Fig. 11.

The foremost film of the stack is removed by forcing the film plate 43 against it with the hooks 54 in the open position as shown in Fig. 6. After the film has been contacted, the cam 57 is rotated by means of the lever 59 to allow the spring 56 to cause the hooks to firmly grip the film against a plate 43.

The handle 37 is now moved forwardly to pull the foremost film from the stack causing the latter, it being flexible, to snap from behind the retaining shoulders 53. As the film snaps from place the cardboard separator 50 immediately following it will be pushed from the stack and allowed to fall through an opening 61 in the bottom of the box 30. It is desired to call attention to the separators as shown in detail in Fig. 12. They are each provided with a series of notches 62 which enable them to pass the retaining shoulders 53 so that they will not be held in place in the magazine after their preceding film has been removed. They are also provided with a second series of notches 63, which remove them from the points of engagement of the hooks 54 to allow the latter free access to the film; as indicated in broken line in Fig. 11. Therefore each time a film is removed from the stack, the separators immediately behind will be ejected therefrom.

Movement of the handle 37 is continued. As it reaches the position of Fig. 7, the gears 40 will engage the teeth of the racks 42 and rotate, as shown in broken line in Fig. 8, to the solid line position in that figure. Further forward movement of the handle 37 now forces the plate 43 and its attached film into a receiving depression 60 in the front of the box 30, as shown in Fig. 9, in which position, the film is exposed to the X-rays.

After exposure, the handle 37 is moved rearwardly, which will reverse the above recited steps, bringing the holder plate 43 to the position of Fig. 7. While it is in this latter position, the releasing lever 59 is rotated to open the hooks 54. This releases the exposed film and allows it to drop through the opening 61. After the film has been released, in the position of Fig. 7, the hooks 54 are left open and the carriage is returned to the position of Fig. 6, at which time, the hooks will be released by manipulation of the lever 59 to engage the next successive film.

A receiver 64 is detachably mounted on the bottom of the box 30 immediately below the opening 61. The exposed films and the cardboard separators alternately drop into this receiver, their fall therein being guided by means of suitable guide plates 65. The receiver can be removed from the box whenever desired, and taken to the dark room for the developing process. A light-excluding slide 66 is provided, which enters a slot 67 in the receiver to render the latter lightproof before removal. A suitable light excluding slide (not shown) could also be provided on the magazine 46 so that it could be removed and replaced. Such slides on film pack and plate holders are well known, and need not be detailed here.

Should it be desired to use fluorescent screens in the device, one of these could be positioned at the exposure end of the box 30, as indicated at 68, and another could be fixedly positioned on the face of the film holder plate 43. The entire box 30 as well as the magazine 46 and the receiver 64 should be lined with lead or other ray-excluding material. The plate 43 should also be formed of, or covered with, lead or other ray-excluding material so that when it is in the position of Fig. 9, it will coact with the ray excluding lining of the box to prevent any rays from entering and damaging the films in the magazine.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. Means for supporting an X-ray film on the interior of a hollow object comprising: a tripod block; extendable legs projecting from said tripod block for engagement with the inner surfaces of said object; a hub member rotatably mounted on said block; an arm extending from said hub member; and film supporting means carried by said arm.

2. Means for supporting an X-ray film on the interior of a hollow object comprising: a tripod block; extendable legs projecting from said tripod block for engagement with the inner surfaces of said object; a hub member rotatably mounted on said block; an arm extending from said hub member; film supporting means carried by said arm; and means for securing said arm in any desired position relative to said block.

3. Means for supporting an X-ray film on the interior of a hollow object comprising: a tripod block; extendable legs projecting from said tripod block for engagement with the inner surfaces of said object; a hub member rotatably mounted on said block; an arm extending from said hub member; film supporting means carried by said arm; a counterweight arm projecting from said hub member; and a counterweight carried by said latter arm to counter-balance the weight of said film supporting means.

4. Means for supporting an X-ray film on the interior of a hollow object comprising: a tripod block; extendable legs projecting from said tripod block for engagement with the inner surfaces of said object; a hub member rotatably mounted on said block; an arm extending from said hub member; film supporting means carried by said arm; a counterweight arm projecting from said hub member; a counter-weight carried by said latter arm to counter-balance the weight of said film supporting means; and means for locking said hub member to said tripod block when desired.

5. Means for supporting an X-ray film on the interior of a hollow object comprising: a tripod block; extendable legs projecting from said tripod block for engagement with the inner surfaces of said object; a hub member rotatably mounted on said block; an arm extending from said hub member; film supporting means carried by said arm; and means for locking said hub member to said tripod block when desired.

6. Means for supporting an X-ray film on the interior of a hollow object comprising: a tripod block; extendable legs projecting from said tripod block for engagement with the inner surfaces of said object; a hub member rotatably mounted on said block; an arm extending from said hub member; a bar hingedly connected to said arm; and film supporting means adjustably mounted on said bar.

7. Means for supporting X-ray film comprising: a film holder box; a film magazine at the rearward extremity of said box; carrying means operable from the exterior of said box for carrying films from said magazine to the forward extremity of said box and holding them in the latter position for exposure; and releasing means also operable from the exterior of said box for releasing the exposed film from the carrying means.

8. Means for supporting X-ray film comprising: a film holder box; a film magazine at the rearward extremity of said box; and means operable from the exterior of said box for carrying films from said magazine to the forward extremity of said box; and holding them in the latter position for exposure; said latter means rotating said films during the carrying operation so that the former rearward face thereof will be turned to face forwardly.

9. Means for supporting X-ray film comprising: a film holder box; a film magazine at the rearward extremity of said box; means operable from the exterior of said box for carrying films from said magazine to the forward extremity of said box and holding them in the latter position for exposure and thence carrying the exposed film from the forward extremity of the box to a position adjacent the rearward extremity thereof; means for releasing the exposed film from the carrying means so that it may fall from said box; and means for receiving the released film.

10. Means for supporting X-ray film comprising: a film holder box; a carriage in said box operable from the exterior thereof to move from a position adjacent the rear end of said box to a position adjacent the forward end thereof; a shaft supported by said carriage and extending transversely of said box; a film holder supported from said shaft so that it will rotate therewith; means on said holder for securing a film thereto; and means for rotating said shaft as said carriage moves to carry the secured film from a position at the back of said box to a position at the front thereof for exposure.

11. Means for supporting X-ray film comprising: a film holder box; a carriage in said box operable from the exterior thereof to move from a position adjacent the rear end of said box to a position adjacent the forward end thereof; a shaft supported by said carriage and extending transversely of said box; a film holder supported from said shaft so that it will rotate therewith; means on said holder for securing a film thereto; a toothed gear carried by said shaft; a fixed toothed rack within said box in the path of said gear to rotate said shaft during its movement.

12. Means for supporting X-ray film comprising: a film holder box; a carriage in said box operable from the exterior thereof to move from a position adjacent the rear end of said box to a position adjacent the forward end thereof; a shaft supported by said carriage and extending transversely of said box; a film holder supported from said shaft so that it will rotate therewith; means for securing a film to said holder; a toothed gear carried by said shaft; a fixed toothed rack within said box in the path of said gear to rotate said shaft during its movement; and means for preventing rotation of the shaft after it has left the extremities of the toothed rack.

13. Means for supporting X-ray film comprising: a film holder box; a film magazine at the rearward extremity of said box; means operable from the exterior of said box for carrying films from said magazine to the forward extremity of said box and holding them in the latter position for exposure; a stack of films in said magazine; separators between the adjacent films; and spring actuated means forcing the stack toward said box.

14. Means for supporting X-ray film comprising: a film holder box; a film magazine at the rearward extremity of said box; means operable from the exterior of said box for carrying films from said magazine to the forward extremity of said box and holding them in the latter position for exposure; a stack of films in said magazine; separators between the adjacent films; spring actuated means forcing the stack toward said box; and engaging means on said carrying means for engaging and removing the foremost film of said stack.

15. Means for supporting X-ray film comprising: a film holder box; a film magazine at the rearward extremity of said box; means operable from the exterior of said box for carrying films from said magazine to the forward extremity of said box and holding them in the latter position for exposure; a stack of films in said magazine; separators between the adjacent films; spring actuated means forcing the stack toward said box; hooks on said carrying means for engaging the foremost film on said stack; a releasing cam engageable with said hooks for unhooking the latter; and means for operating said releasing cam from the exterior of said box.

16. A multiple X-ray film holder comprising: a holder box; a film magazine opening to the rearward extremity of said box; a stack of films in said magazine; spring restraining means urging said stack forwardly toward said box; means for restraining the forward movement of said stack; a movable film holder within said box; means operable from the exterior of said box for bringing said holder into contact with the foremost film in said stack; and gripping means on said holder for gripping said foremost film to withdraw it from said restraining means.

17. A multiple X-ray film holder comprising: a holder box; a film magazine opening to the rearward extremity of said box; a stack of films in said magazine; spring restraining means urging said stack forwardly toward said box; means for restraining the forward movement of said stack; a movable film holder within said box; means operable from the exterior of said box for bringing said holder into contact with the foremost film in said stack; gripping means on said holder for gripping said foremost film to withdraw it from said restraining means; and separating members separating the adjacent films in said stack, said separating members being cut away so as to avoid engagement with both said restraining means and said gripping means.

GEORGE R. HEIMERICH.